United States Patent [19]

Nomiyama

[11] Patent Number: 5,267,156
[45] Date of Patent: Nov. 30, 1993

[54] METHOD FOR CONSTRUCTING A KNOWLEDGE BASE, KNOWLEDGE BASE SYSTEM, MACHINE TRANSLATION METHOD AND SYSTEM THEREFOR

[75] Inventor: Hiroshi Nomiyama, Kawasaki, Japan
[73] Assignee: International Business Machines Corporation, Armonk, N.Y.
[21] Appl. No.: 803,276
[22] Filed: Dec. 5, 1991
[51] Int. Cl.$^5$ .............................................. G06F 15/38
[52] U.S. Cl. ............................................... 364/419.02
[58] Field of Search ......................................... 364/419

[56] References Cited

U.S. PATENT DOCUMENTS

| | | | |
|---|---|---|---|
| 4,535,199 | 2/1987 | Muraki | 364/419 |
| 4,916,614 | 4/1990 | Kaji et al. | 364/419 |
| 5,056,021 | 10/1991 | Ausborn | 364/419 |

*Primary Examiner*—Roy N. Envall, Jr.
*Assistant Examiner*—Khai Tran
*Attorney, Agent, or Firm*—Louis J. Percello

[57] ABSTRACT

A method and apparatus for machine translation of language is disclosed. For each translation pattern, qualified words and corresponding translations are extracted. The invention generalizes words by converting them into concepts which are more general and can be applied to many inputs. A partial thesaurus is generated that describes hierarchies of words and concepts that are hypernyms of these words. Based on frequency information obtained for the words, an importance value is computed for each concept. Importances are used to determine the possibility of generalizing concepts in the translation.

13 Claims, 14 Drawing Sheets

METHOD FOR CONSTRUCTING A KNOWLEDGE BASE, KNOWLEDGE BASE SYSTEM, MACHINE TRANSLATION METHOD AND SYSTEM THEREFOR

BACKGROUND OF THE INVENTION

1. Field of the Invention

This invention relates to an improvement of case-based machine translation (hereafter abbreviated to CBMT), a novel knowledge base for translation not restricted to CBMT, and a translation process using the translation acknowledge contained in said knowledge base.

2. Description of the Prior Art

Various machine translation systems have appeared as commercial products. Most are based on translation rules given by human beings (that is, they operate according to the principle of rule-based machine translation, hereafter abbreviated to RBMT). In order to make such a system, complicated cases must be collected, and the collection of such cases and the development of rules or dictionaries require a great deal of human labor. As a result, it is difficult to predict the side-effects among rules made by many persons, and the cost of maintenance is enormous. Nevertheless, it is difficult to fully cover all exceptional cases with rules. In addition, it is not certain that rules directed to general cases are always adequate.

In an attempt to overcome the drawbacks of rule-based systems, translation systems based on actual translation examples (translation cases) in lieu of rules have been proposed by many papers, including "A framework for mechanical translation between Japanese and English by the analogy principle" by M. Nagao, Artificial and Human Intelligence, ed. A. Elithorn and R. Baenrtji, pp. 173-180, North-Holland, 1984.

FIG. 19 shows an arrangement of a conventional CBMT system. As shown in the figure, in translation by conventional CBMT, a translation case base containing a huge number of translation cases and a thesaurus is prepared and accessed. As a simple example, the handling of "N ni V" in Japanese-to-English machine translation is discussed below. Assume that the case base has a case C in which preposition "in" was selected as a translation of the word "ni" in a Japanese sentence containing "ichigatsu ni (in January)" and "kuru (come)," and that a Japanese sentence Q that contains "shigatsu ni (in April)" and "kuru (come)" but that does not exist in the case base is input to the CBMT system. The system searches the translation case base for cases similar to Q in order to translate "N ni V". While using the thesaurus, the system computes the distances from Q of all cases in the translation case base. Since "ichigatsu (January)" and "shigatsu (April)" are included in the same conceptual category in the thesaurus, the system finds C to be the most similar case to the input Q, and translates the input "ni" as "in". In this manner, CBMT simulates the process of translation by a human being whereby a sentence that does not exist in the case base is translated by analogy with a known translation of a similar sentence. This is a remarkable system that ensures reliable translation and overcomes the limitations of RBMT without giving any rules, as long as reliable translation cases are collected.

3. Statement of Problems with the Prior Art

Conventional CBMT, however, involves the following problems. First, cases to be stored in the translation case base are collected arbitrarily. CBMT's advantage of being able to handle exceptions derives from this. As a result, however, the number of accumulated cases becomes enormous and many of the cases become redundant. For example, for "shigatsu ni" (in April) to be translated adequately, it is sufficient that one example of "ichigatsu ni (in January)" exists; nevertheless, many cases of "X gatsu ni" usually exist. Hence the system accesses the translation case base and tries to find the most similar case in a vast search space every time a sentence is to be translated. Moreover, to this end, the system sequentially calculates the distances from a word in the input sentence to the words in the cases, and obtains a case with the minimum distance (the best match). As a result, a number of cases must be checked. Therefore, the system is not efficient and takes along time to translate a passage.

One solution would categorize words in detail in order to compute distances efficiently; however, if the thesaurus is updated only to cope with specific translation patterns, it will be usable only for machine translation. Maintenance of a specialized thesaurus for machine translation relies on the users of the translation system, and requires a great deal of labor.

Since, of course, a huge translation case base must be maintained for translation, the problem of restricted storage resources of a translation system cannot be disregarded.

OBJECTIVE

The object of the invention is to provide a system and a method for translation that overcome the inefficiency in searching of conventional CBMT while maintaining its advantages.

SUMMARY OF THE INVENTION

Conventional CBMT is inefficient in searching because translation cases to be referred to for translation are held in the translation case base at word levels, and comparison of an input that does not exist in the case base with translation cases is performed by measuring word-to-word distances.

This invention extracts, for each translation pattern, qualified words and corresponding translations from translation cases, and generalizes words by converting them into concepts in order to obtain cases that have a high generality and that can be applied to many inputs. A word is converted into a concept by referring to the thesaurus. However, it is not sufficient to convert a word contained in a translation case into a hypernym simply by consulting the thesaurus. Specifically, generalization must ensure that a large number of cases can be generalized into more abstract cases and that some cases can be obtained from a small number of exceptions. To meet these requirements, a partial thesaurus (a translation pattern thesaurus) is generated that describes the hierarchies of words contained in the extracted translation cases and concepts that are hypernyms of those words. For each of those words, information about a corresponding translation and the frequency of cases in which the word and the translation occur is obtained. Then, on the basis of the frequency information obtained for the words, the importance value of the translation is computed for each concept in the partial thesaurus. The possibility of generalization is determined by using the importances of translations computed for concepts.

In the translation step, the cases so obtained and the thesaurus are referred to. If a word pattern that meets the aforementioned translation pattern is found in an input expressed in the source language, a case containing a qualified word or hypernym thereof is obtained, and translation is performed in accordance of the translation contained in the obtained case.

DETAILED DESCRIPTION

Figure 1:
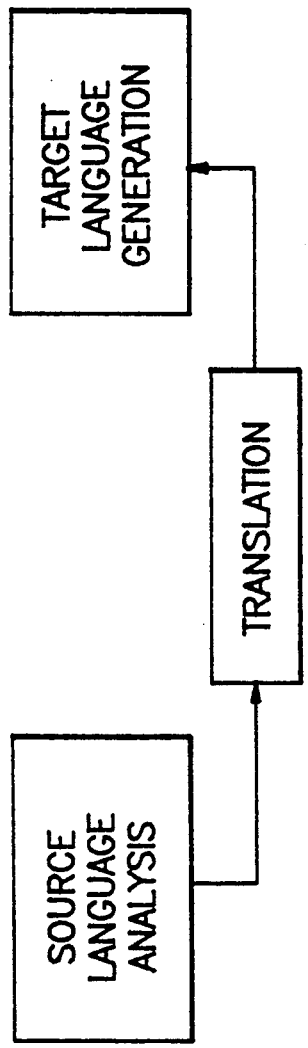
FIG. 1 is an explanatory view of the basic elements of a machine translation system.
Figure 2:
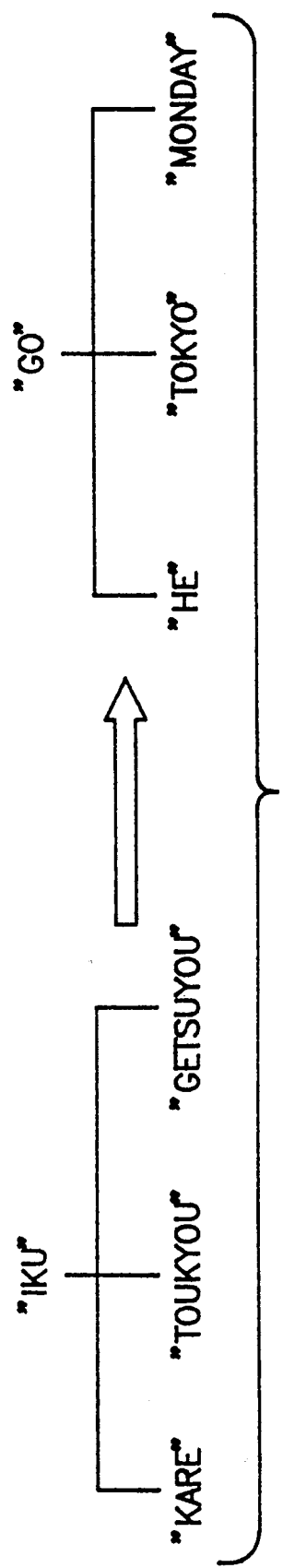
FIG. 2 is a diagram showing an example of an input and an output in the translation process.

A machine translation system, in general, includes three processes, namely, source language analysis, translation, and target language generation, as shown in FIG. 1. In source language analysis, the dependency structure of a source language is generated from an input expressed in the source language (typically in the form of a sentence). The dependency structure is a tree that represents the modifier and modifiee relations among content words (see FIG. 2). In translation, the dependency structure of the source language is converted into a dependency structure of a target language. In target language generation, an output expressed in the target language is generated from the dependency of the target language. The invention eliminates conventional difficulties in the translation process, and improves the efficiency of the machine translation system. Since source language analysis and target language generation can be done by using known techniques, explanation of them is omitted.

The invention applies to two aspects of a machine translation system. One is generalization, which obtains the generalized translation cases necessary for translation. The other is translation, in which the generalized cases are interpreted and applied. First generalization and then translation will be explained.

1. Generalization

Generalization is a process for converting a case into a more generally applicable case by replacing a "word" appearing in a given example with a more abstract "concept." The term "word" here means a word or a compound word. Let a "concept" be defined as a hypernym of a word listed beforehand by a given thesaurus.

Figure 3:
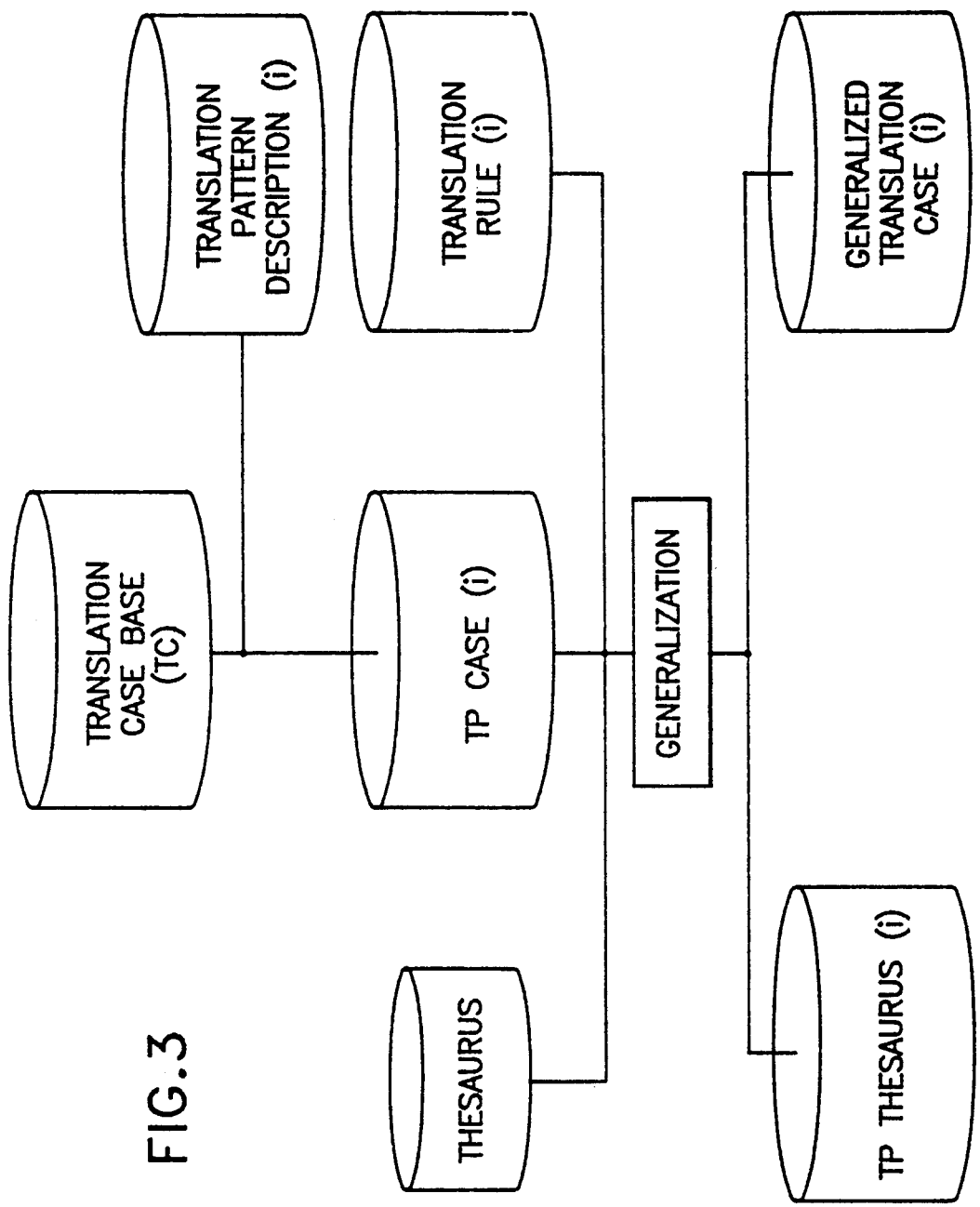
FIG. 3 is a diagram showing the flow of data in the generalization process.

FIG. 3 shows the data involved in generalization and their flow. The data and flow are now explained.

1.1. Data (1) Thesaurus

Figure 4:
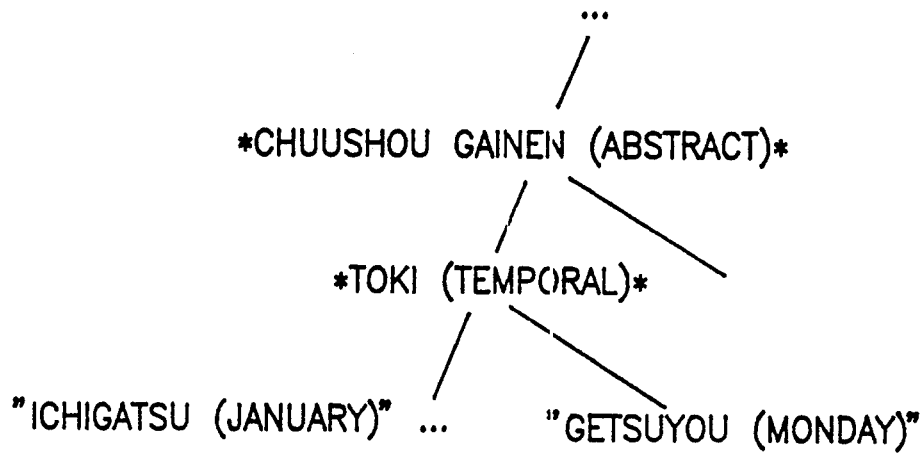
FIG. 4 is a diagram showing an example of a thesaurus.

This is a hierarchical structure representing taxonym relations of words and concepts, and is kept in a storage apparatus. An example of an extract from a thesaurus is shown in FIG. 4. In the figure, a node enclosed in double quotations is a word, whereas a node enclosed in asterisks is a concept. For example, *toki (temporal)* is a concept, and "getsuyou (Monday)" is a word. Hereafter, words and concepts are indicated in this manner.

(2) Translation Case Base

Figure 5:
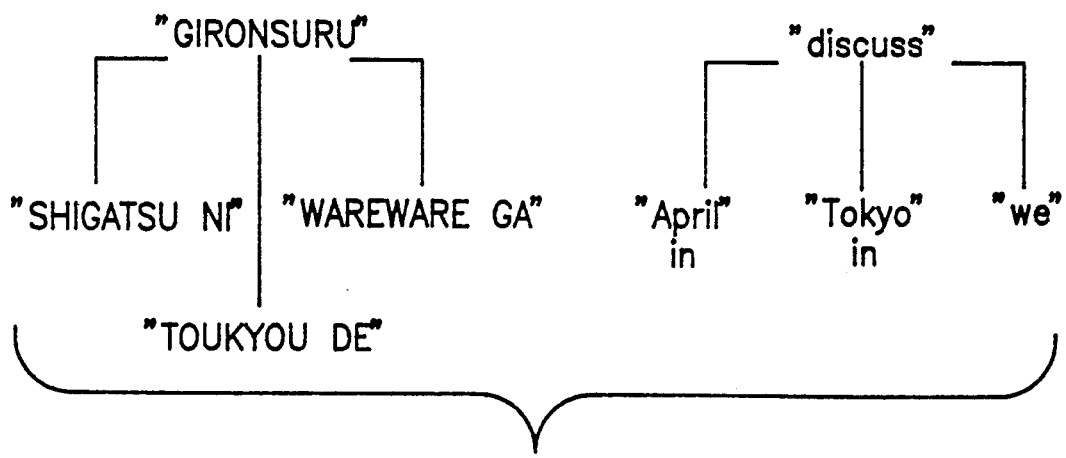
FIG. 5 is a diagram showing an example of a translation case accumulated in a translation case base.

This is accumulation of translation cases and is kept in a storage apparatus. A translation case is a pair of the dependency structure of an input expressed in a source language and the dependency of an output expressed in a target language. The relations between nodes in each dependency tree are specified. FIG. 5 shows an example of a translation case.

(3) Translation Pattern Description

This is a description of a pattern for conversion from a source language into a target language. A translation pattern may be input by using an appropriate apparatus when carrying out generalization; however, it is preferable to prepare it beforehand in the form of a file, keep it in a storage apparatus, and read it out when necessary. A translation pattern contains source language patterns, target language patterns, and inter-node links —(see FIG. 6). Source language patterns and target language patterns contain terms whose values are not decided (variables). Hereafter, variables of the source language are indicated by Xi, and those of the target language by Yi (i is a natural number). A translation pattern is described on the assumption that once a variable of the source language has been determined, a variable of the target language is determined. The invention is applied to a translation pattern that permits the value of a variable of the source language to be a word. Source language words that appear as variable values in cases that match the translation pattern are subject to generalization. A list of values (Y1, ... Ym) that can be variables in the target language when the values of the source language variables are determined is called a value for the translation pattern. All that is required for this value is that it should be determined when the variables of the source language are determined. For example, it may consist of words, phrases, features such as tense or number, or combinations of words and features. A value is expressed by Equation 1 below as a function of variables of the source language:

$$(Y1, \ldots, Ym) = F(X1, \ldots, Xn) \qquad \text{Equation 1}$$

Hereafter, a variable is simply called a term, and the number of variables in the source language is called the number of terms. Equation 1 represents a translation pattern description whose number of terms is n.

Figure 6:
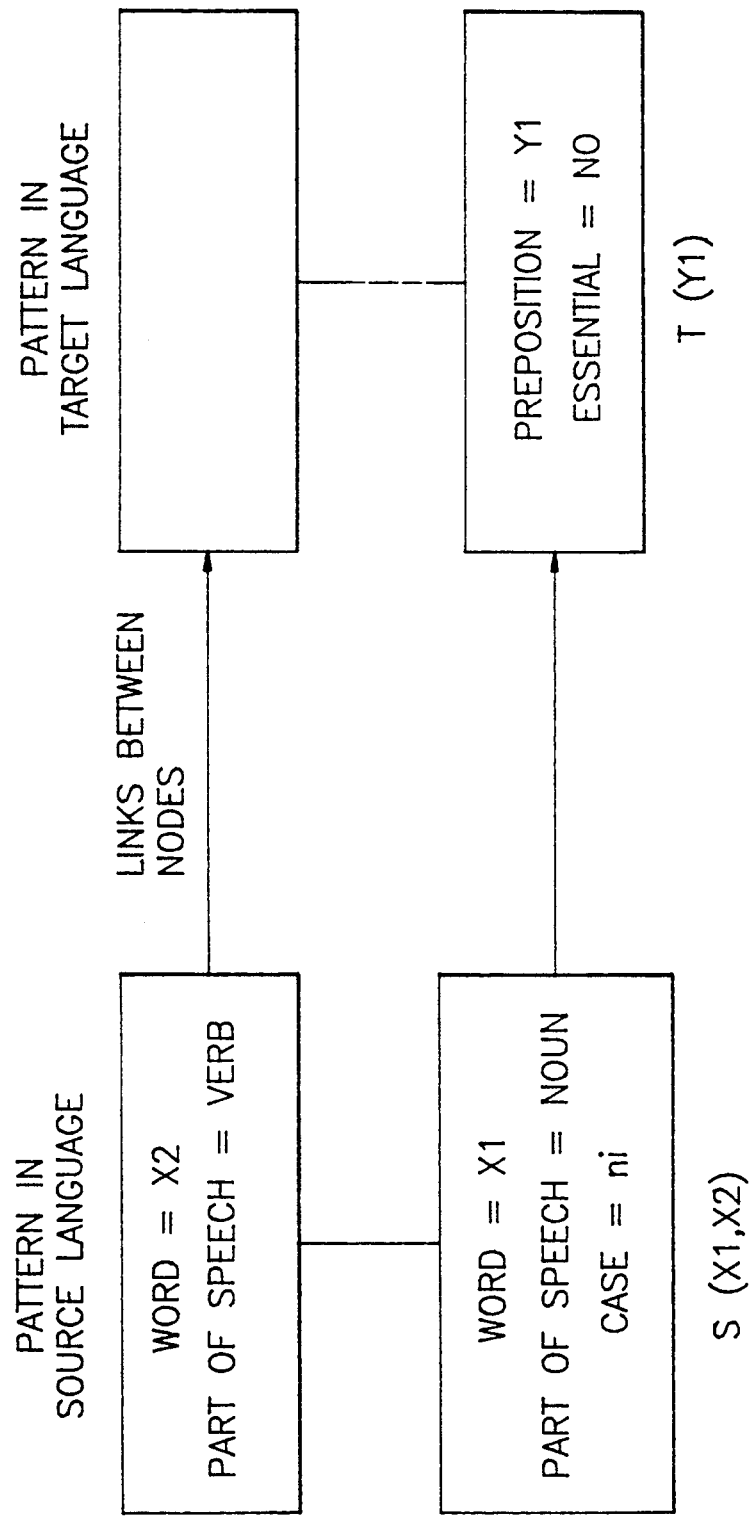
FIG. 6 is a diagram showing a translation pattern description with two terms.

FIG. 6 shows an example of an actual translation pattern description, for "N ni V". The conditions indicated by this example are that a noun X1 modifies a verb X2 accompanying "ni" in an input expressed in Japanese (typically in the form of a Japanese sentence), and that the translation of X1 is not essential for a corresponding English verb. It also indicates that a preposition Y1 accompanied by a corresponding English noun is determined by the noun X1 and the verb X2 under the conditions. The word "prepositions" is used in a broad sense to include expressions consisting of several words (such as "in front of"). One such preposition can be the value of the variable Y1 in the target language. The explanation given below uses the example of translation of "N ni V", as shown in FIG. 6.

(4) Translation Pattern Cases (TP Cases, TPCs)

Translation pattern cases are obtained by searching the translation case base for translation cases containing a word pattern in the source language that meets the conditions specified by the translation pattern description, and by extracting the values (words) of variables of the source language and corresponding translations (values). Therefore, they include only extracted cases and not generalized ones. From one case that matches the conditions, one or more translation pattern cases are obtained. The translation pattern cases so obtained are stored in a storage apparatus and are subject to generalization in a narrower sense (described later). Since translation pattern cases are required only for generalization and are not utilized for the translation process, they may be deleted after generalization.

In the example of "N ni V", a search is made for translation cases in which a noun in the Japanese sentence has a grammatical case "ni", in which the above noun modifies the verb, and in which the grammatical case of the translated noun in English is not essential. The values of noun X1, verb X2, and the corresponding preposition Y1 in the translation cases are then extracted. Ten translation pattern cases obtained for "N ni V" are shown in Table 1.

TABLE 1

| X1 | X2 | Value (translation) |
|---|---|---|
| "sangatsu (March)" | "kowasu (break)" | ("in") |
| "shigatsu (April)" | "gironsuru (discuss)" | ("in") |
| "gogatsu (May)" | "saiketsusuru (vote)" | ("in") |
| "rokugatsu (June)" | "hieru (cool)" | ("in") |
| "getsuyou (Monday)" | "arau (wash)" | ("on") |
| "kayou (Tuesday)" | "kimaru (be decided)" | ("on") |
| "shuumatsu (weekend)" | "agaru (rise)" | ("on") |
| "higashi (east)" | "utsuru (shift)" | ("to") |
| "toukyou (Tokyo)" | "idousuru (move)" | ("to") |
| "shichigatsu (July)" | "idousuru (move)" | ("in") |

(5) Translation Rules

The translation rules discussed in this specification determine the correspondence between the values of variables in the source language that meet the conditions specified by the translation pattern and values in the target language, independently of cases accumulated in the translation case base. Typically, they are developed by human rule developers. They are different from translation pattern cases extracted from cases in that they permit the value of a variable in the source language to be a concept. Therefore, they can be described at an abstract level. The example shown below means that preposition "in" is chosen for the pattern of "*basho (location)* ni *seishin koui (thought/intention and action)*" (for example, "toukyou ni asobu (have a good time in Tokyo)").

| X1 | X2 | Value |
|---|---|---|
| *basho (location)* | *seishinzkoui* | (thought/intention and action) ("in") |

Preferably, translation rules are also stored beforehand in the same manner as the translation pattern descriptions.

(6) Generalized Translation Cases

Generalized translation cases are obtained by generalizing cases for each translation pattern. A generalized translation case consists of values of variables in the source language, values in the target language, and their importances. If, however, the number of source language terms is one, it is not necessary to compute the importances. The importances are used for selecting the most reasonable (important) case when multiple generalized cases applicable to an input are found in the translation process. An importance is expressed by a value from 0 to 1; the larger the value, the more important the generalized case. The example shown below indicates that the importance is 0.037 when X1 is *concrete", X2 is *abstract, and the value is ("to").

| X1 | X2 | Value | Importance |
|---|---|---|---|
| *gutaigainen* (concrete) | *cuushoutekikankei* (abstract) | ("to") | 0.037 |

Generalized translation cases are stored and are accessed during the translation process.

1.2. Outline of Process

Figure 7:
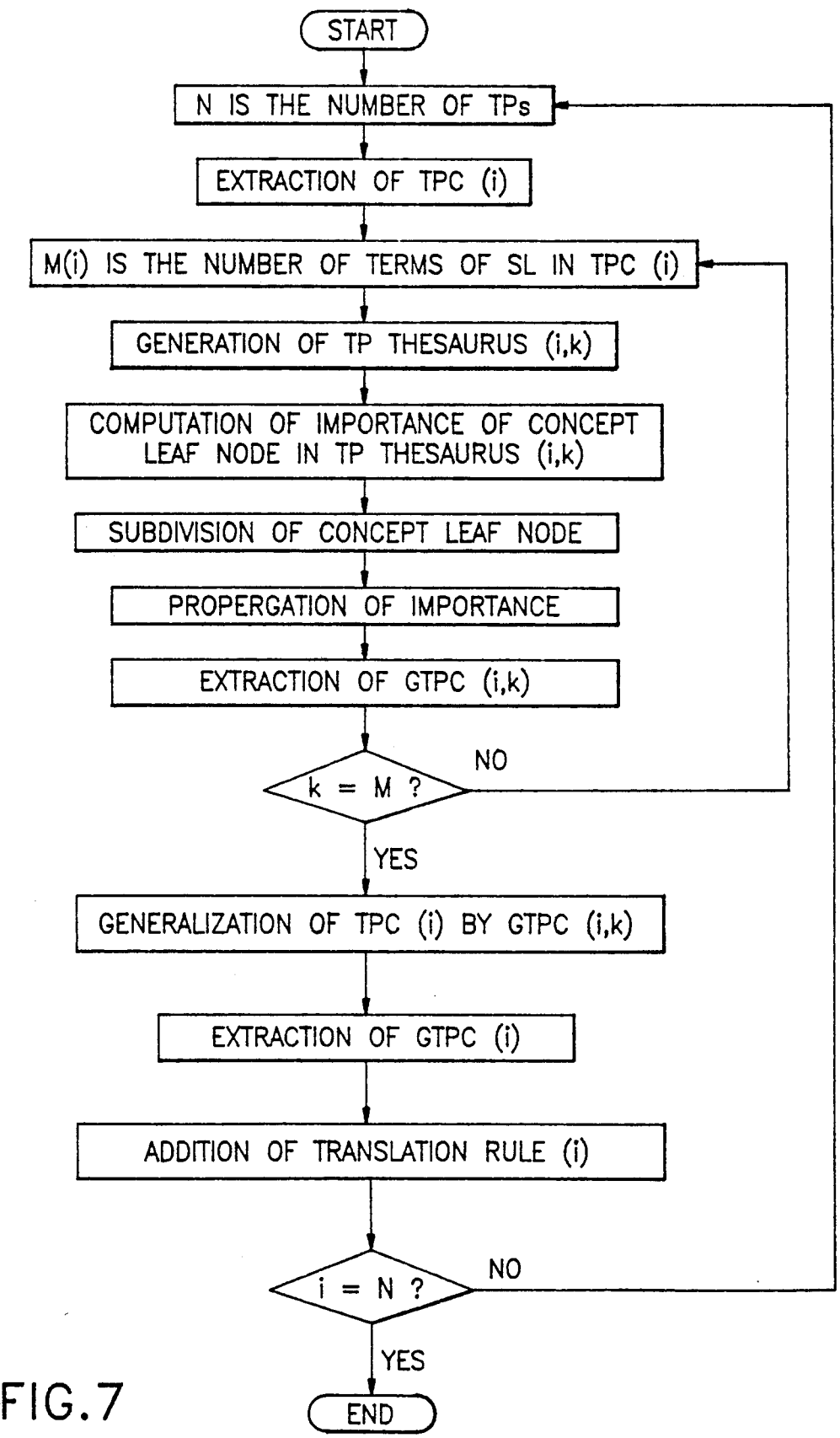
FIG. 7 is a flow chart of the generalization process.

FIG. 7 shows an outline of generalization in a broader sense for obtaining generalized translation cases. Generalization in a broader sense is performed for each translation pattern by using a computer, and includes the step of obtaining translation pattern cases by accessing the apparatus that stores the translation pattern description and the translation case base, and the step of generalization in a narrower sense for obtaining generalized translation cases by accessing the apparatus that stores translation pattern cases and the apparatus that stores the thesaurus. Translation rules, if given, should be also generalized in the narrower sense. For some translation patterns, thesauri of translation patterns are generated as a result of the generalization process in the narrower sense. The generalized translation cases and the translation pattern thesauri so generated are accumulated in a storage apparatus and utilized during the translation process.

(1) Extraction of Translation Pattern Cases (i)

First, the case base is accessed, and translation cases that meet the conditions specified by the translation pattern description (i) (i is an integer in the range $0 < i < = N$, and N is the total number of translation pattern descriptions) are searched for. The values of the variables in the source language and their corresponding translations are then extracted, thereby generating translation pattern cases. A set of translation pattern cases obtained for translation pattern (i) is called translation pattern case (i) or TPC (i). The following explanation concerns the situation in which the translation pattern case (i) consists of the ten translation pattern cases shown in Table 1. Various sets of data are generated for translation pattern (i). They are shown with the number i attached, as in translation pattern case (i), so that their relations with translation pattern (i) can be easily recognized.

(2) Generation of Translation Pattern Thesaurus (i, k) (Partial Thesaurus)

For each source language variable or term of the translation pattern case (i) extracted from the case base in accordance with the translation pattern description (i), a translation pattern thesaurus (i, k) (where $0 < k <= M(i)$ and $M(i)$ is the number of source language terms of the translation pattern description (i)) is generated and stored in a storage apparatus.

This is achieved, for each term, by accessing to apparatus that stores the thesaurus and by extracting the parts of the thesaurus that contain words occurring in the term and their hypernyms. Then, pairs of a word and a corresponding value, and the frequency of the pairs, are set in a corresponding word node in the translation pattern thesaurus (i, k). Note that the translation pattern thesaurus is required only during the narrower generalization process, and may be deleted thereafter.

Figure 8:
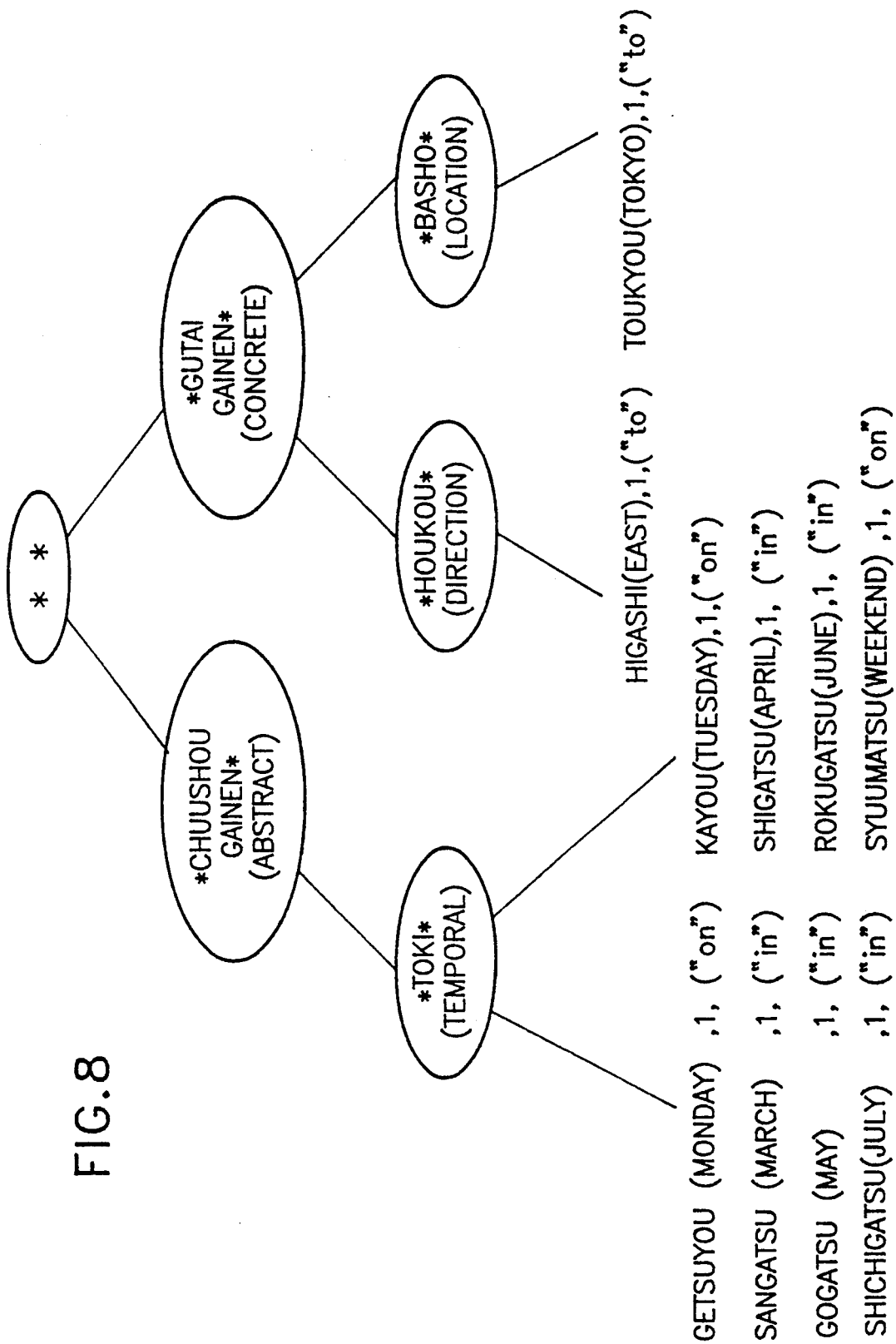
FIG. 8 is a diagram showing a translation pattern thesaurus (i, 1).
Figure 9:
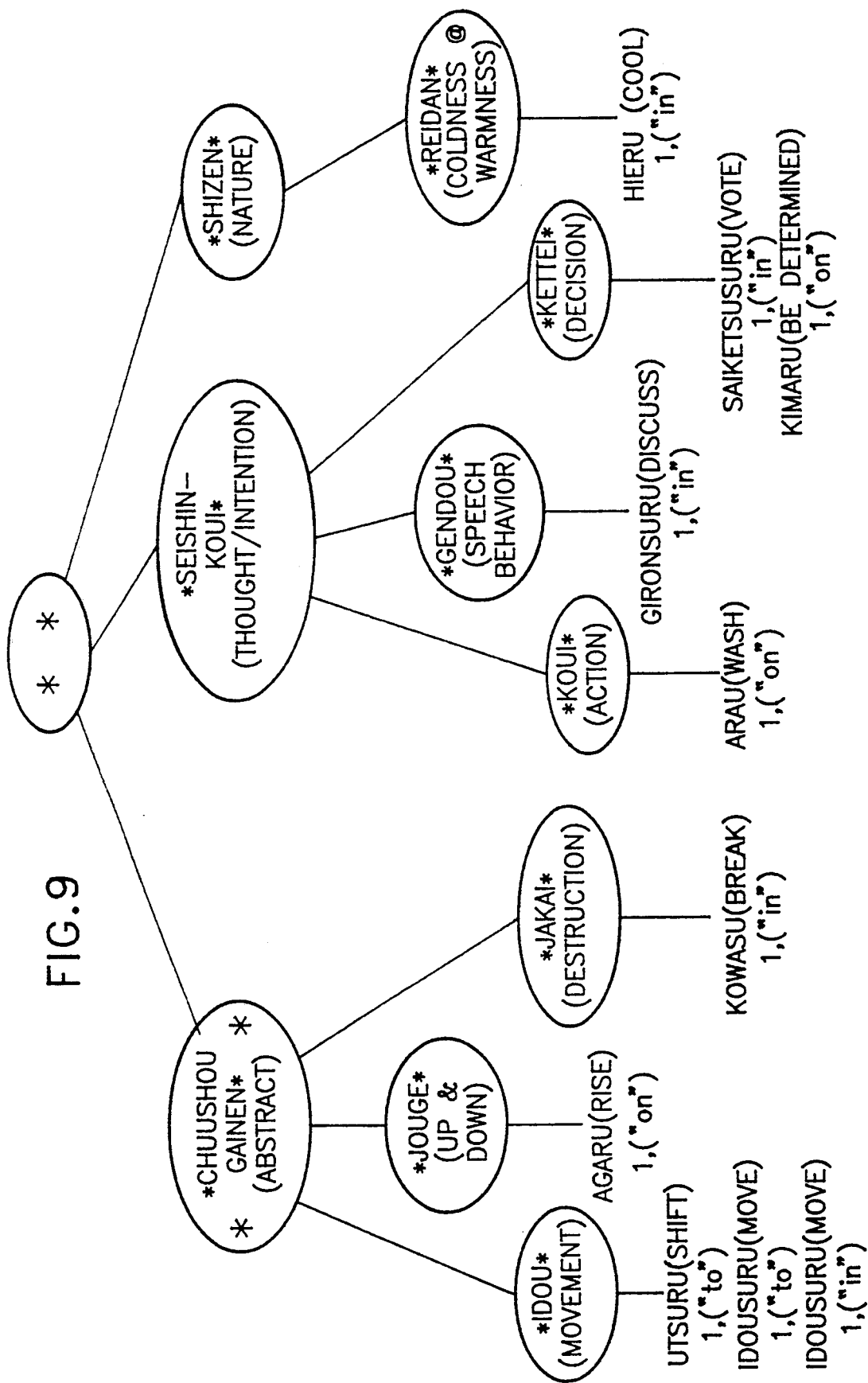
FIG. 9 is a diagram showing a translation pattern thesaurus (i, 2).

For example, the translation pattern thesaurus shown in FIG. 8 is generated for the first term of the translation pattern cases shown in Table 1, while the translation pattern thesaurus shown in FIG. 9 is generated for the second term. Although the illustration is simplified, eight word nodes such as "getsuyou (Monday)" are carried by the node of *toki (temporal)* shown in FIG. 8. In the embodiment, if the same word takes different values in different cases, a node is made for each value. "Idousuru (move)" shown in FIG. 9 is an example.

(3) Computation of the importance of the Concept Leaf Node in the Translation Pattern Thesaurus (i, k)

The importance of some supplementary factors for computing the importance of a generalized translation case is defined here. Let the total number of translation pattern cases extracted by the translation pattern description (i) be referred to as L(i).

a. Importance of Links

The importance of a link in the translation pattern thesaurus is a factor representing the weight of the link between nodes, and is defined as the probability of occurrence of a case contained in a subtree whose root is a node directly coupled to the link, with respect to all the translation pattern cases. That is, if the total number of cases contained in the subtree is S, the importance of the link is represented by S/L(i). In the example shown in FIG. 8, the importance of the link coupling "getsuyou (Monday) " and *toki (temporal)* is 1/10.

b. Importance of Nodes

The importance of a node in a K-th term translation pattern thesaurus is represented by the square root of the sum of the squares of the occurrence probabilities of the values contained in a subtree that has the node at its root. This can be a value from 0 to 1. If all values are equal in the subtree, the importance of the node is 1. The importance of the *toki (temporal)* node shown in FIG. 8 is obtained as follows:

$$\text{root}(\text{sqr}(3/8) + \text{sqr}(5/8)) = 0.729$$
$$\text{sqr}(x) := x*x;$$
$$\text{root}(x) := \text{square root of } x$$

c. Importance of Values

The importance of a specific value of a specific node in the translation pattern thesaurus is defined by multiplying the importance of the specific value of each child node linked to the specific node by the importance of the link, then adding the multiplication results for all the child nodes, and multiplying the sum by the importance of the node. The importance of the value ("in") of the *toki (temporal)* node shown in FIG. 8 is:

$$(1/10) \times 5 \times (\text{importance of *toki (temporal)* node}) = 0.365$$

The importance of the value ("on") is:

$$(1/10) \times 3 \times (\text{importance of *toki (temporal)* node}) = 0.219$$

The importance of a specific value in a word node is defined as the frequency of the specific value. First of all, the importances of all links in the translation pattern thesaurus (i, k), the importances of all nodes, and the importances of the values in concept leaf nodes are calculated. A concept leaf node is a concept node in the thesaurus whose child is a word node.

Figure 10:
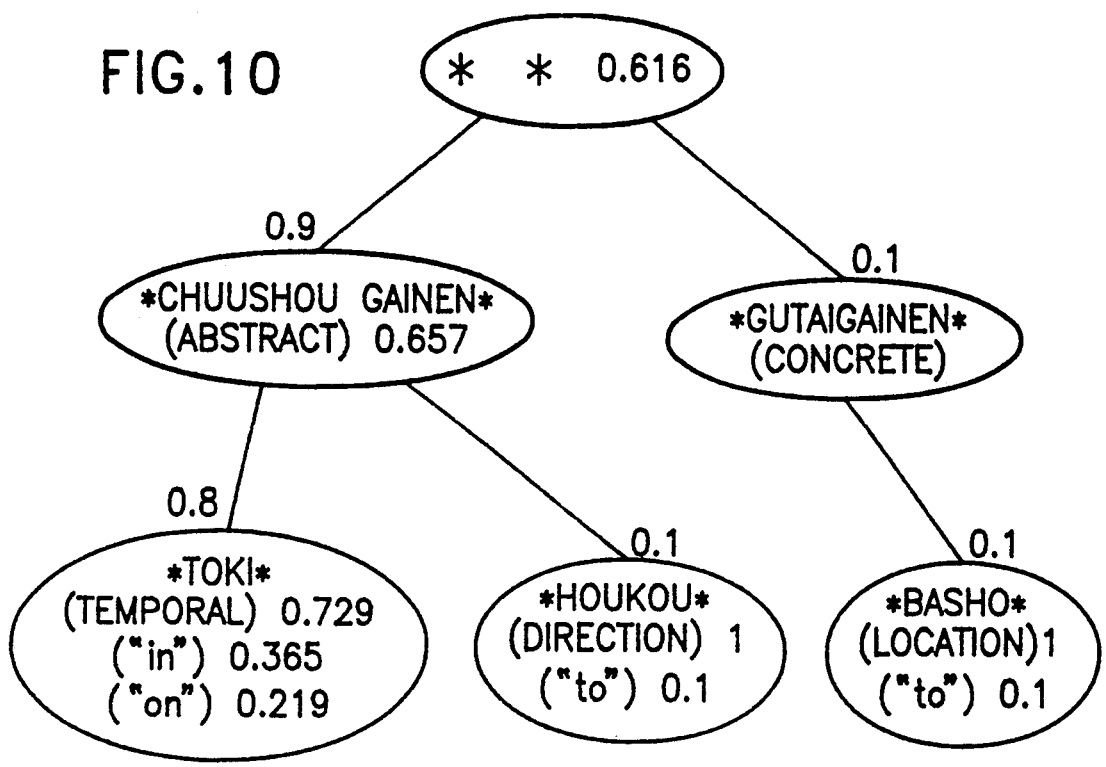
FIG. 10 is a diagram showing the result of computing the importances of values only for the concept leaf nodes of a translation pattern thesaurus for a first term.

FIG. 10 shows how the importance of the translation pattern thesaurus for the first term is calculated in the above manner.

(4) Subdivision of Concept Leaf Node

Next, the values in a concept leaf node that do not have the highest importance in that concept leaf node are noted. If the importance of any such value is larger than a predetermined threshold value and if the number of cases can be decreased by subcategorization, some of the words in the concept leaf node are subcategorized by categorizing words corresponding to a qualified value into a new concept. A new node is generated for the new concept between the original concept leaf node and the word nodes. The purpose of setting a threshold value and comparing other values with this value is to prevent unnecessary subcategorization and to extract only those concepts that are important but have not been categorized.

In the example shown in FIG. 10, let the threshold value be 0.2. The importance of the value ("on"), the second largest in the *toki (temporal)* node, is 0.219, and there is more than one word node whose value is ("on"). Therefore, the *toki (temporal)* node is subject to subdivision.

A unique name is given to a generated node. The importances of a generated node and an original node are recalculated. When a newly generated node in the example shown in FIG. 10 is named *X*, the importance of the *X* node is 1, and the importance of the value "on" in the *X* node is 0.3. The importance of the original *toki (temporal)* node is also recalculated. Propagation of the importance from the newly generated concept node (explained later) is not carried out at this stage.

Figure 11:
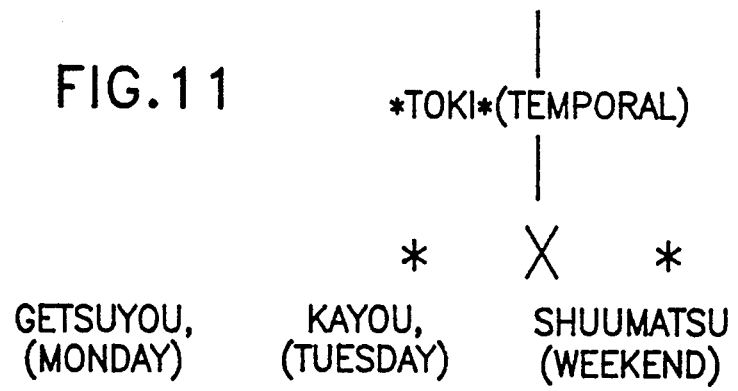
FIG. 11 is a diagram showing an example of a translation pattern thesaurus (i).

In response to subcategorization, a translation pattern thesaurus (i) for translation pattern (i) is generated. In the translation pattern thesaurus, a new concept node will be a child of the original concept leaf node (see FIG. 11).

A concept leaf node is subdivided because, in most cases, there is a category that is effective for a specific translation pattern, that is, a category that can narrow the search space needed to find similar cases. In order to prevent direct description of such a category in the original thesaurus, the translation pattern thesaurus is generated to store the category in a storage apparatus separately from the original thesaurus. As a result, category information significant only for translation is concentrated in the translation pattern thesaurus, while the original thesaurus is not updated. Therefore, the original thesaurus maintains its generality. If category information that is significant only for translation is directly described in the original thesaurus, this will be specialized in the translation process, and a user of the translation processing system will be responsible for subsequent maintenance of the thesaurus. In contrast, the embodiment described here does not require a user to maintain the thesaurus. Of course, if the user does not mind the labor involved, he can update the thesaurus. The generalization process and translation process according to the invention are also applicable when such a specialized thesaurus is used.

However, one of the reasons for the subdivision of concept leaf nodes may be that the thesaurus is insufficient by itself. If information on the sub-categorization of concepts is fed back to a person in charge of maintaining the thesaurus, it will become reference information for adding new categories to the thesaurus. For example, if new concept nodes containing common words are generated in some translation patterns, it is highly probable that the categories of concepts prepared in the thesaurus will be insufficient. In this case, it is preferable to consider updating the thesaurus. In the example, if it is considered important to categorize words such as "getsuyou (Monday)" linked to the *X* node into a single concept for a purpose other than translation of "N ni V", the concept *shuujitsu (weekday)* may be provided in the thesaurus.

(5) Propagation of Value Importance

In the step subsequent to generalization, the importance of each of the values in nodes other than concept leaf nodes is calculated by propagating the importance of each of the values from lower higher nodes (source nodes). What is propagated is a value obtained by multiplying the importance of the value in a source node by the importance of a link and further multiplying the result by the importance of the target node. At first, importance value propagation is started from concept leaf nodes in a bottom-up fashion. With reference to the example shown in FIG. 10, the importance of ("in") propagated upward from *toki (temporal)* is:

0.365 * 0.8 * 0.657 = 0.192

When all upward propagation from lower (hyponym) nodes to higher (hypernym) nodes has been completed, then the system determines whether it should perform downward propagation from a higher node to a lower node. Downward propagation occurs only when the lower node is a concept node and the value to be propagated is not smaller than the importance of the maximum value of the lower node.

Figure 12:
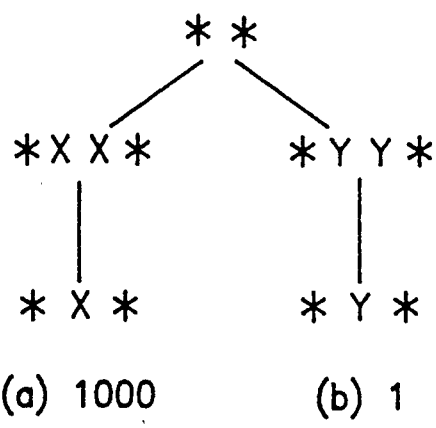
FIG. 12 is a diagram showing the propagation of importance to a lower node.

The purpose of downward propagation is to prevent higher modes from being affected by occasional exceptions, that is, from being over-generalized. This is explained below with reference to FIG. 12. Assume that there are one thousand cases whose value is (a) in *x* and one case whose value is (b) in *y* . If only bottom-up propagation is permitted, only the value (b) affects *yy*. However, the choice of value (b) in *yy* may be general or exceptional. This must be determined by taking all the cases into consideration. If it is determined that the choice of value (b) in *yy* is exceptional, then it is desirable to propagate the importance of the value (a) downward to *yy*.

For example, in the *concrete* node in FIG. 10, the importance of ("to") propagating from the bottom is 0.01. In contrast, since the value of ("in") propagating from a higher node is 0.0107 and is larger than 0.01 ("to"), downward propagation occurs. As a result, both ("in") 0.0107 and ("to") 0.01 are recorded as values of the *concrete* node.

According to the aforementioned method, the importances of all values of all nodes are computed. Results are shown for the translation pattern thesaurus for the first term in FIG. 13 and for the second term in FIG. 14, respectively.

(6) Extraction of Generalized Translation Pattern Case (i,k)

For each term of the source language, the values of that term in the translation pattern cases are converted into hypernyms, namely, more abstract concepts, by using the importances calculated in the manner described above. This generalization of each term starts from the bottom level (word) in the translation pattern thesaurus (i, k), and is repeated from lower nodes to higher nodes in a bottom-up manner. If the value having the most importance in a lower node is the same as the value having the most importance in the node immediately above it, the lower node is generalized.

Figure 13:
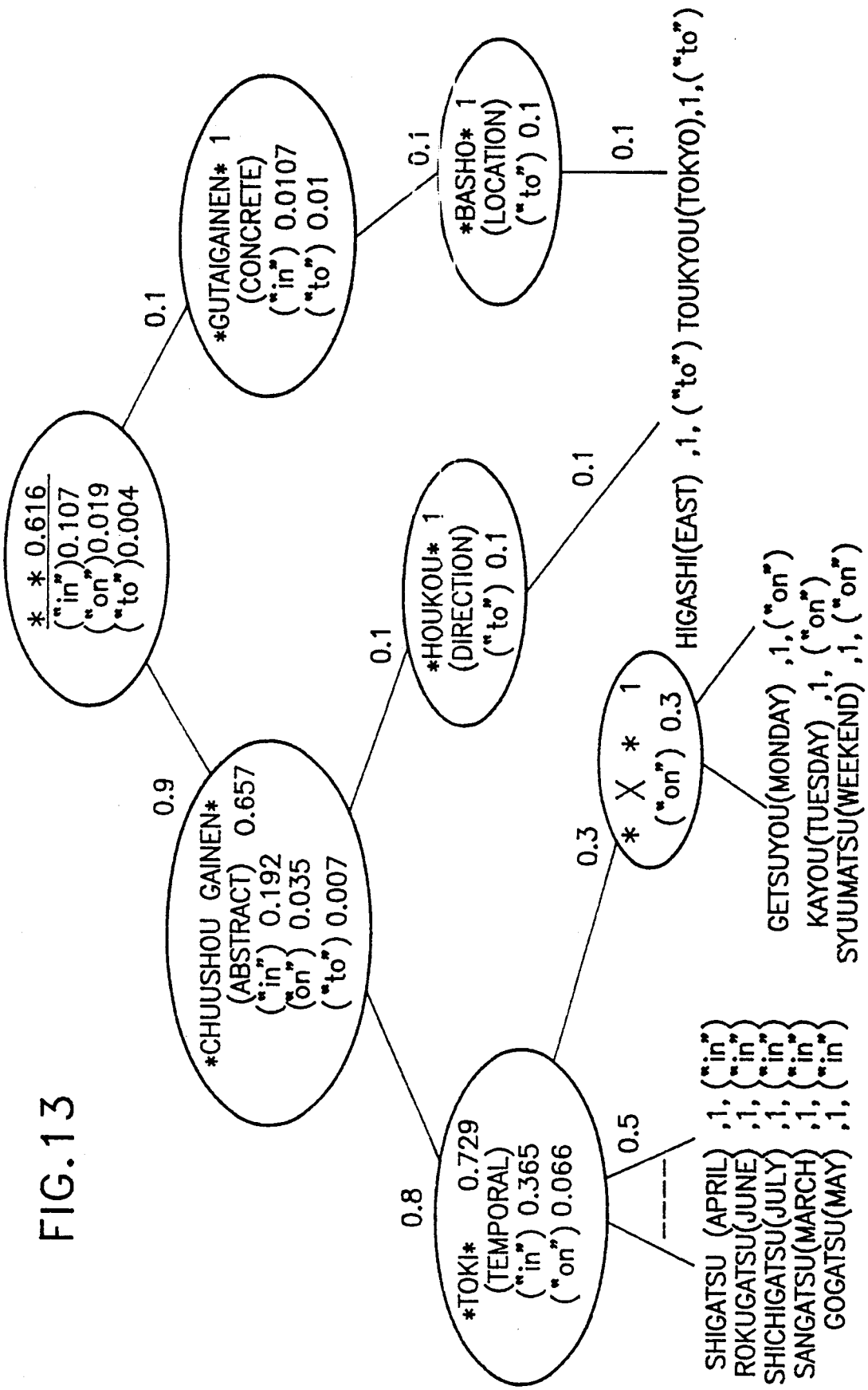
FIG. 13 is a diagram showing the result of computing the importances of all values for a first term.
Figure 14:
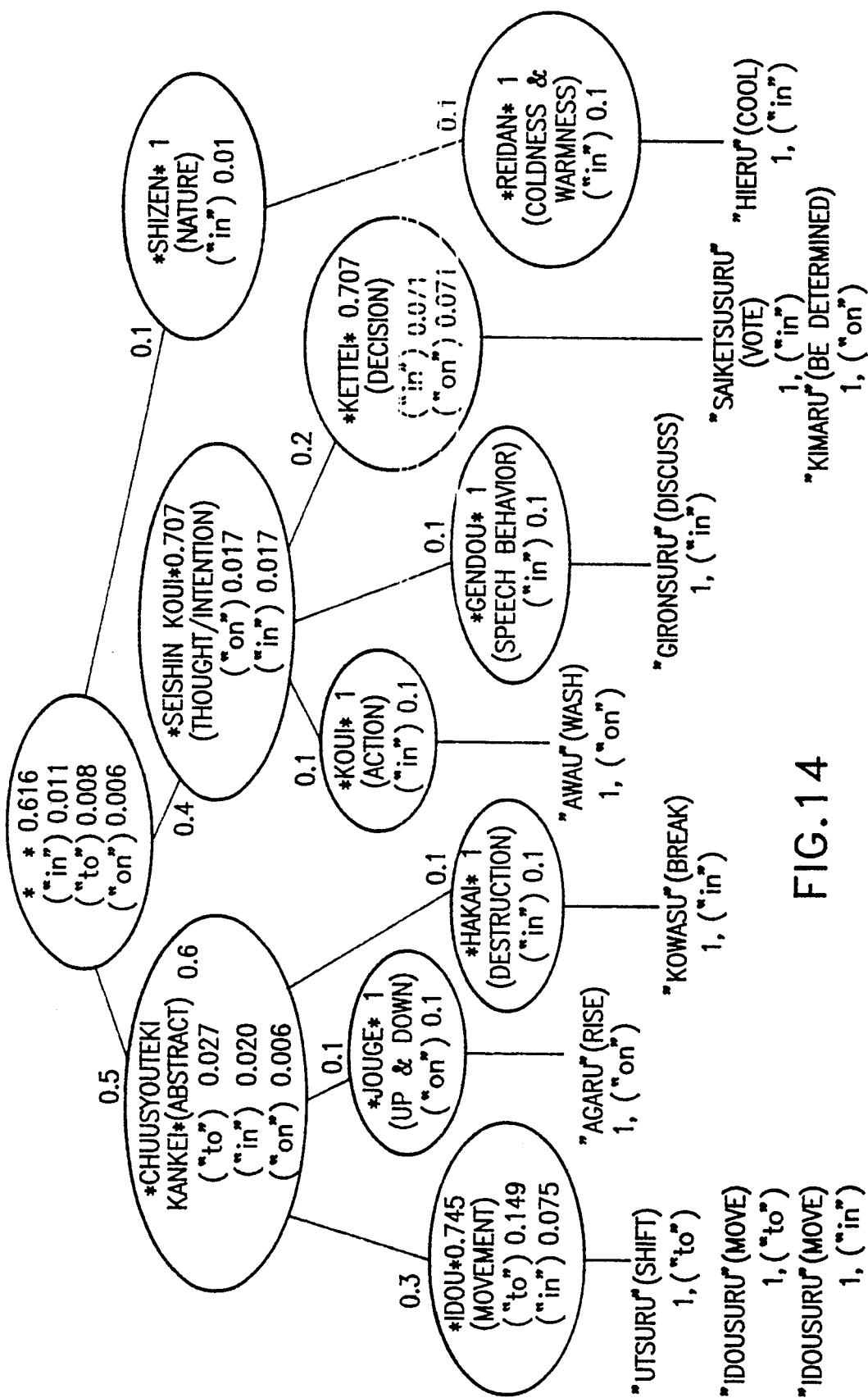
FIG. 14 is a diagram showing the result of computing the importances of all values for a second term.

As an example, generalization of the lower node (a word node such as "getsuyou (Monday)") of *X *, shown in FIG. 13, is discussed. Since the values of all the lower nodes of *X* are ("on") (in other words, the value ("on") has the most importance), and the value with the most importance in the *X* node is also ("on"), all of the lower nodes of *X* are generalized to *X*. At the higher node *temporal*, however, the value with the most importance is ("in"). Therefore, the lower nodes of *X* are generalized to *X*. On the other hand, the value ("in") has the most importance in the *toki (temporal)* node and its direct child nodes such as "shigatsu (April)". It also has the most importance in the higher nodes *chuushougainen (abstract)* and **. Therefore, direct children of the *toki (temporal)* node are generalized up to **.

As a result of such generalization, generalized translation pattern cases for the first term are finally obtained as shown in Table 2.

TABLE 2

| X1 | Value | X1' |
|---|---|---|
| "sangatsu (March)" | ("in") | ** |
| "shigatsu (April)" | ("in") | ** |
| "gogatsu (May)" | ("in") | ** |
| "roku gatsu (June)" | ("in") | ** |
| "getsuyou (Monday)" | ("on") | *X* |
| "kayou (Tuesday)" | ("on") | *X* |
| "shuumatsu (weekend)" | ("on") | *X* |
| "higashi (east)" | ("to") | *houkou (direction)* |
| "toukyou (Tokyo)" | ("to") | *basho (location)* |
| "shichigatsu (July)" | ("in") | ** |

It is understood from the translation pattern cases that X1 is generalized to *X* if X1 is "getsuyou (Monday)" and the corresponding value is ("on").

Similarly, generalized translation pattern cases for the second term are obtained as shown in Table 3.

TABLE 3

| X2 | Value | X2' |
|---|---|---|
| "kowasu (break)" | ("in") | *hakai (destruction)* |
| "gironsuru (discuss) behavior)* | ("in") | *gendou (speech |
| "hieru (cool)" | ("in") | ** |
| "arau (wash)" | ("on") | *koui (action)* |
| "agaru (rise)" | ("on") | *jouge (up and down)* |
| "utsuru (shift)" | ("to") | *chuushoutekikankei (abstract)* |
| "idousuru (move)" | ("to") | *chuushoutekikankei (abstract)* |

Note here that generalized translation pattern cases have not been generated from "saiketsusuru (vote)", "kimaru (be determined)", and "idousuru (move)" accompanying the value "in".

(7) Generalization of Translation Pattern Case (i)

(7.1) Generalization of Translation Pattern Case (i) by Intra-term Generalization (i, k)

The translation pattern case (i) first obtained is generalized here on the basis of the generalized translation pattern cases (i, k) obtained by process (6). The following case in Table 1 is discussed as an example:

| X1 | X2 | Value |
|---|---|---|
| "sangatsu (March) | "kowasu (break)" | ("in") |

It is known from the generalized translation pattern cases (Tables 2 and 3) that "sangatsu (March)" and "kowasu (break)" are generalized respectively to ** and *hakai (destruction)*. As a result of these generalizations, the following generalized case is obtained:

| X1 | X2 | Value |
|---|---|---|
| ** | *hakai (destruction)* | ("in") |

In the embodiment, if multiple generalized translation cases with the same contents have been obtained, only one of them is adopted, to prevent redundancy. From the cases in Table 1 are obtained the generalized cases shown in Table 4.

TABLE 4

| X1 | X2 | Value |
|---|---|---|
| ** | *hakai (destruction)* | ("in") |
| ** | *gendou (speech behavior)* | ("in") |
| ** | "saiketsusuru (vote)" | ("in") |
| ** | ** | ("in") |
| *X* | *koui (action)* | ("on") |
| *X* | "kimaru (be determined)" | ("on") |
| *X* | *jouge (up and down) | ("on") |
| "basho(location)* | *chuushoutekikankei(abstract)* | ("to") |
| *houkou(direction)* | *chuushoutekikankei(abstract)* | ("to") |
| ** | "idousuru (move)" | ("in") |

(7.2) Inter-term Generalization

If the number of terms is one, the generalized cases obtained by (7.1) become the final generalized cases. If, on the other hand, the number of terms is more than one, a word is generalized up to a less abstract concept by intra-term generalization, in which other terms are not taken into consideration. Therefore, even if the generalization level of pattern cases obtained by (7.1) is low, inter-term generalization, which takes other terms into consideration, makes it possible to obtain more abstract cases, in which less abstract words or concepts are replaced by more abstract concepts. To this end, K-th term maximum generalization (K=1, 2, . . .) is carried out for each of the generalized cases obtained to generate finally generalized translation cases.

K-th term maximum generalization means that the K-th term is first generalized to the maximum, with other terms fixed, and that the other terms are subsequently generalized. Specifically, an (n+1)th-level generalized case, in which a K-th term word or concept of an (n)th-level generalized case has been replaced by a hypernym, is tentatively provided, where the generalized cases obtained by (7.1) are first-level generalized cases. The importance of a possible value of the (n+1)th-level case is then calculated by summing the importances of the values in TP thesaurus nodes corresponding to words or concepts contained in the (n+1)th-level case. If the value that has the most importance in the (n+1)th-level generalized case so calculated coincides with the value that has the most importance in the (n)th-level generalized case, the (n)th-level generalized case is generalized to the (n+1)th-level generalized case. That is, the (n+1)th-level generalized case is kept, and the (n)th-level generalized is deleted. By repeating this procedure until generalization is no longer possible, the K-th term is generalized to the maximum. Next, another term that has already been fixed is generalized to the maximum by repeating the same procedure as that for the K-th term, with the K-th term fixed. The importance of the case resulting from K-th term generalization is defined to be the maximum-value importance computed for the case.

The generalized case "*ikusaki (distination)* *chuushoutekikankei (abstract)* ("to")" of Table 4 is explained below as an example. The first-term maximum generalization is first carried out. *Basho (location)* is tentatively replaced by its hypernym, *gutaigainen (concrete)*. The importance of a possible value of the second-level generalized case, "*gutaigainen (concrete)* *chuushoutekika nkei (abstract)*", is defined to be the sum of the importances of the respective values in the *gutaigainen (concrete)" node in FIG. 13 and the *chuushouteki kankei (abstract)* node of FIG. 14. Therefore, the importances of the possible values of the second-level generalized case are:

for ("to"), 0.01+0.027=0.037 for ("in"), 0.0107+0.020=0.0307 for ("on"), 0+0.006=0.006

The importance of ("to") is maximum in the first generalized case and the second-level generalized case. Therefore, the first-level case is generalized to the second-level case. Further, the importances of the possible values of a third-level generalized case, "** chuushoutekikankei ( abstract)", are as follows:

("to") 0.004+0.027=0.031

("in") 0.107+0.020=0.127

("on") 0.019+0.006=0.025

Since the importance of ("to") is not maximum in the third-level generalized case, further generalization is not possible for the first term.

Next, generalization is attempted for the second term. "*Gutaigainen (concrete)* *chuushoutekikanke i (abstract)*" is the first-level generalized case. Since the hypernym of *chuushoutekikankei (abstract)* is **, the second-level generalized case is "*gutaigainen (concrete)* **", and the importances of its possible values are:

("to") 0.01+0.008=0.018

("in") 0.0107+0.011=0.0217

("on") 0+0.006=0.006

Since the importance of ("to") is not maximum in the second-level generalized case, further generalization is not possible for the second term. Here the first-term maximum generalization terminates. As a result of the first-term maximum generalization of the generalized case "*basho (location)* *chuushoutekikankei (abstract)* ("to")", a case "*gutaigainen (concrete)* *chuushoutekikankei (abstract)* ("to")" is obtained, and its importance is 0.037.

Next, second-term maximum generalization is performed for this generalized case. The importances of the possible values of a second-level generalized case, "basho (location) **", are:

("to") 0.1+0.008=0.108

("in") 0+0.011=0.011

("on") 0+0.00 6=0.006

Since ("to") has the maximum value, the first-level case is generalized to the second-level case. The second term cannot be further generalized be cause it has no more hypernyms. Next, generalization is attempted for the first term. "*Basho (location)* ** ("to")" is the first-level generalized case. The importances of the possible values of the second-level generalized case "*gutaigainen (concrete)* ** ("ti")", are:

("to") 0.01+0.008=0.01 8

("in") 0.0107+0.011=0.0217

("on") 0+0.006=0.006

Since ("to") does not have a maximum value, generalization for the first term also terminates here. The case finally obtained by second-term maximum generalization is

| *basho (location)* | ** | ("to") | 0.108 |
|---|---|---|---|

As a result of inter-term generalization of one generalized case "*basho (location)* *chuushoutekikankei (abstract)* ("to")", the following two generalized translation pattern cases are obtained:

| *gutaigainen (concrete)* | *chuushoutekikankei (abstract)* | ("to") | 0.037 |
|---|---|---|---|
| *basho (location)* | ** | ("to") | 0.108 |

If the number of terms is three, first-term maximum generalization of a generalized case may be performed either in the order of first, second, and third terms or in the order of first, third, and second terms. In this embodiment, it is performed in both ways. Therefore, a total of two generalized translation pattern cases are obtained by first-term maximum generalization. As a result, if the number of terms is three, 6 (=3 * 2) generalized cases are obtained by inter-term generalization. In general, if in the source language the number of terms in a translation pattern description is M (M_1), a total of M*(M−1) generalized translation pattern cases are obtained by inter-term generalization. In the embodiment, however, if multiple generalized translation pattern cases are duplicated, one of them is adopted, and the rest are deleted.

By means of the foregoing procedures, the generalized translation pattern cases (i) shown in Table 5 are obtained from all of the generalized cases (i) shown in Table 4.

TABLE 5

| ** | ** | ("in") | 0.018 |
|---|---|---|---|
| *X* | ** | ("on") | 0.306 |
| *gutaigainen (concrete)* | *chuushoutekikankei (abstract)* | ("to") | 0.037 |
| *basho (location)* | ** | ("to") | 0.108 |
| *houkou (direction)* | ** | ("to") | 0.108 |

In this fashion, the final generalized translation pattern cases GTPC (i) (Table 5) are obtained from the translation pattern cases TPC (i) (Table 1), and GTPC (i, k) (Tables 2 and 3) and intermediate generalized cases (Table 4) are also derived TPC(i). Since the final generalized translation pattern cases GTP (i) are the cases used for the translation process, other cases may be deleted when generalization is complete.

However exceptional a translation pattern case is, the invention examines its generalization. As a result, however low the level of generalization achieved for an exceptional translation pattern (or even if no generalization results), the result never fails to exist in the generalized translation pattern cases (i). Therefore, CBMT's advantage of being able to handle exceptions is maintained.

(7.3) Addition of Translation Rule (i)

Finally, translation rules (i) (a set of translation rules provided with translation pattern (i)) are added to the generalized translation pattern case (i). In the embodiment, if the generalized translation pattern case (i) already includes a generalized case whose contents are the same as those of a translation rule, the translation rule is not added; however, if it includes a generalized case of which only the value (translation) is different from a translation rule, the generalized case is replaced by the translation rule. The importance of the translation rule is the sum of the importances of its values in corresponding nodes in the translation pattern thesaurus. Therefore, the importance of "*seishin koui (thought/intention and action)* *basho (location)*('-'in")", which was previously taken as an example, is the sum of the importance of ("in") in the *location* node, shown in FIG. 13, and its importance in the *action* node, shown in FIG. 14 (0+0.017=0.017). *basho (location)* *seishin koui (action)* ("in") 0.017

Generalized translation pattern cases (i) finally obtained in this manner are shown in Table 6 below:

TABLE 6

| ** | ** | ("in") | 0.118 |
|---|---|---|---|
| *X* | ** | ("on") | 0.306 |
| *gutaigainen (concrete)* | *chuushoutekikankei (abstract)* | ("to") | 0.037 |
| *basho (location)* | ** | ("to") | 0.108 |
| *houkou (direction)* | ** | ("to") | 0.108 |
| *basho (location)* | *seishin koui | ("in") | 0.017 |

TABLE 6-continued
(thought/intention and action)

Thus, the invention can equally handle cases collected in a bottom-up manner from translation cases and rules described in a top-down manner. Also, an importance reflecting the frequency of actual cases is given to each of the rules. Therefore, if a less general rule is added, a low importance is given to it, and therefore it is used less frequently in the translation process. Hereafter, a generalized translation case includes an added translation rule.

2. Translation Process

The translation process according to the invention using a computer is explained below with reference to FIG. 15, which shows referential relations among data, and FIG. 16, which shows an outline of the process.

First, reference is made to an outline of the translation processing system. As shown in FIG. 15, the data to be stored beforehand in a storage apparatus for the translation process are a translation pattern description (i), a generalized translation pattern case (i), a translation pattern thesaurus (i), and the original thesaurus. Therefore, a huge and redundant translation case base need not be kept in storage and referred to, unlike in conventional CBMT; instead, it is sufficient to keep and refer to a compact generalized translation pattern case (i) and a translation pattern thesaurus (i) obtained by generalization in a broader sense. Therefore, the time required for the translation process and the number of data to be stored are reduced significantly. Note that the knowledge base, namely the generalized translation pattern case (i) corresponding to the translation pattern description (i), is indispensable; however, the translation pattern thesaurus (i) may not exist, because subdivision of a concept leaf node does not necessarily occur for every translation pattern description (i). The respective steps of the translation process are explained below.

2.1 Determination of the Translation Pattern by a Planner

When an input, typically a sentence, in a source language read by an OCR or extracted from a document file has a portion to be translated, and the dependency structure of the input is transferred from a source language processor (not shown) to a translation processing system, a planner determines which translation pattern description should be applied to the input. If multiple translation patterns are applicable, the planner determines the order in which they should be applied. It is possible that the number of applicable translation patterns is restricted or that a particular translation pattern should be applied preferentially to a special input. The planner is used to improve the translation efficiency of such inputs. Therefore, if no such particular treatment is required, the planner is not necessary. In this case, all the translation patterns are applied to all inputs in a given order.

2.2 Search for the Shortest-Distance Generalized Translation Pattern Case

Once a translation pattern to be applied has been determined, the input dependency structure is searched in order to determine whether the input includes a word pattern that meets specified conditions, that is, in order to confirm whether any part of the input dependency structure matches a source language pattern of the translation pattern description (i). If the pattern is not found, the next translation pattern is applied.

If a structure that meets the specified conditions is found, a shortest-distance generalized translation pattern case is searched for in the generalized translation pattern cases (i).

Figure 17:
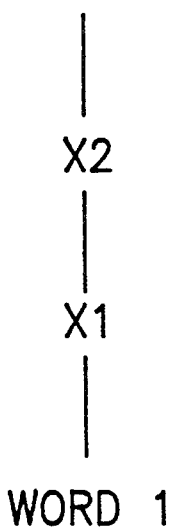
FIG. 17 is a diagram showing how to obtain a shortest-distance case when the number of terms is one.

Let the number of terms in the translation pattern description (i) be M. If $M=1$, the word or concept that is closest to the variable of an input and is contained in GTPC (i) (the shortest-distance word or concept) is searched for. The search is made in a bottom-up manner by using the original thesaurus and the TP thesaurus (i). The generalized translation pattern case containing the shortest-distance word or concept is the shortest-distance GTPC. If no generalized translation pattern case containing word 1 exists but a generalized translation pattern case containing concept X1 exists in the example shown in FIG. 17, the case containing X1 is the shortest-distance generalized translation pattern case.

If M is greater than one, the K-th term shortest-distance translation pattern cases ($K=1, \ldots .M$) are searched for in the generalized translation pattern cases (i), and the obtained case that has the most importance (i) is selected as the shortest-distance generalized translation pattern case. For $M=2$, the first-term shortest-distance case is the generalized translation pattern case that contains the shortest-distance word or concept for the first term. If multiple candidates exist, the one whose second-term word or concept has the shortest-distance is the first-term shortest-distance case. Similarly, the second-term shortest-distance case is the generalized translation pattern case containing the shortest-distance word or concept for the second term. If multiple candidates exist, the one whose first-term word or concept has the shortest-distance is the second-term shortest-distance case. Once the first-term shortest-distance case and the second-term shortest-distance case have been obtained, their importance is compared, and the one that has more importance is selected as the shortest-distance generalized translation pattern case.

Figure 18:
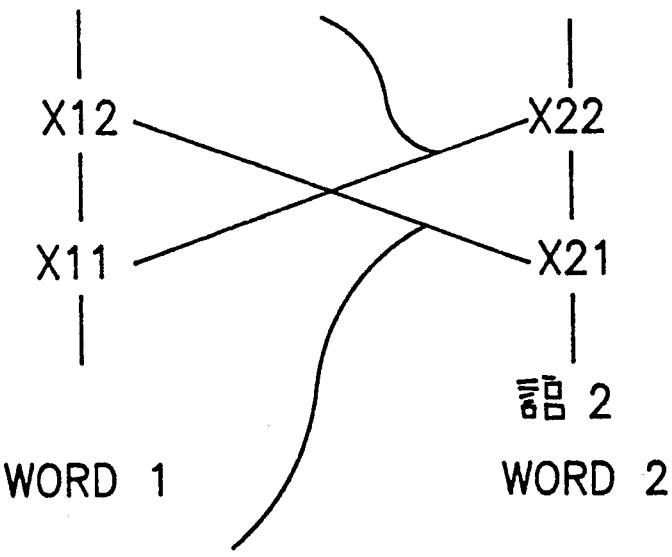
FIG. 18 is a diagram showing how to obtain a shortest-distance case when the number of terms is two.
Figure 19:
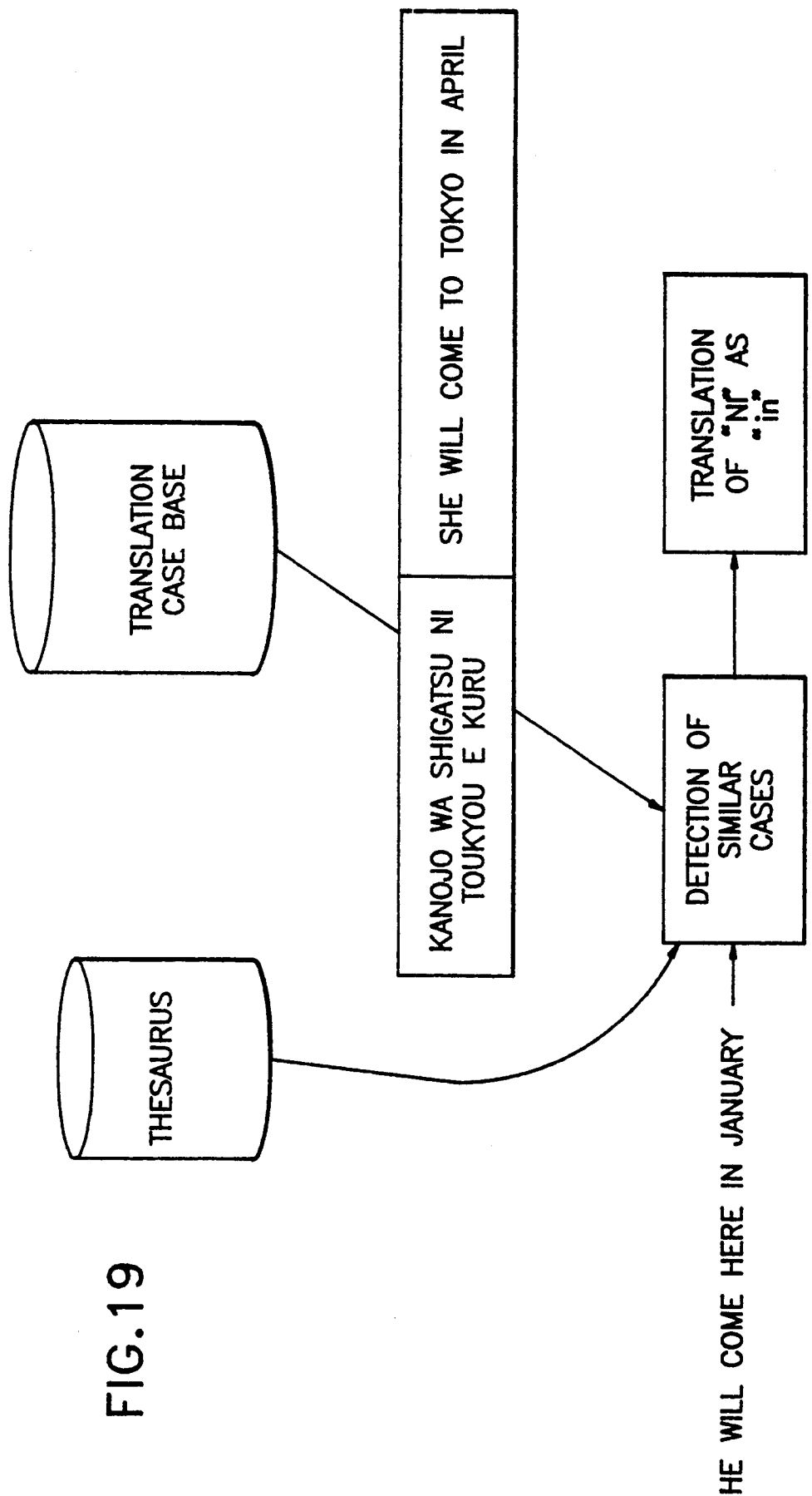
FIG. 19 is a diagram showing an outline of translation by a conventional CBMT system.

In FIG. 18, assume that the shortest-distance case for the first term is a generalized translation pattern case containing X11 and X22, while the shortest-distance case for the second term is a generalized translation case containing X12 and X21. The one that has more importance is selected as the shortest-distance generalized translation pattern case.

If the number of terms M is three, there are two ways of obtaining the first-term shortest-distance case; one is to obtain the shortest-distance words or concepts in the order of the first, second, and third terms, and the other is to obtain the shortest-distance words or concepts in the order of the first, third, and second terms. In this embodiment, it is obtained in both ways. Therefore, a total of two generalized translation pattern cases are obtained as the first-term shortest-distance cases. As a result, when the term number is three, a total of 6 ($=3*2$) generalized cases are obtained. In general, if the source language number of terms in a translation pattern description is M ($M\_1$), a total of $M*(M-1)$ generalized translation pattern cases are obtained as the K-th term shortest-distance cases. The one that has the most importance is selected as the shortest-distance generalized translation pattern case.

2.3 Application of Translation Pattern Description (i)

Once the shortest-distance generalized translation pattern case has been obtained, the translation to be output in response to the input is determined as the value of the generalized translation pattern case. Then, by performing conversion according to the translation pattern description and by giving the value to a variable of the target language, the dependency structure of the target language is generated.

When all possible translation pattern descriptions have been applied, post-processing is performed if desired. After this, the output dependency structure is transferred to a target-language generator (not shown). The target-language generator generates from the received dependency structure an output (typically a sentence) expressed in the target language. The generated output is visually shown on a display, stored in a disk file, and so forth.

3. Translation Example

As an example, translation o f an input sentence containing "getsuyou ni (on Monday)" and "furu (rain)" is explained below by using one of the generalized translation pattern cases in Table 6. Assume that hypernyms of "furu (rain)" are *tenkou (climate)*, *nature*, and **, in that order, from the bottom level up.

First, a shortest-distance generalized translation pattern case for the first term, "getsuyou (Monday)", is searched for. Then, it is examined to determine whether any generalized translation pattern case has "getsuyou (Monday)" at X1. Since no such case is found, higher concepts of "getsuyou (Monday)" have to be obtained. In order to obtain higher concepts of a word, a check is first made to determine whether any translation pattern thesaurus having the same number i as the translation pattern description exists or not. If so, it (FIG. 11) is searched before the original thesaurus, since the translation pattern thesaurus has been generated in response to the translation pattern. As a result, *X* is obtained as a higher concept of "getsuyou (Monday)". When a generalized translation pattern case having *X* as the first term is searched for, only the following case is found:

| *X* | ** | ("on") | 0.306 |
|---|---|---|---|

Therefore, this is the first-term shortest-distance generalized translation pattern case.

Similarly, the shortest-distance generalized translation pattern case for the second term, "furu (rain)", is determined to be "*X* ** ("on") 0.306". Accordingly, "ni" is translated as "on".

Therefore, output dependency structure data that hold "on" as the value of variable Y1 shown in FIG. 6 are generated.

Figure 15:
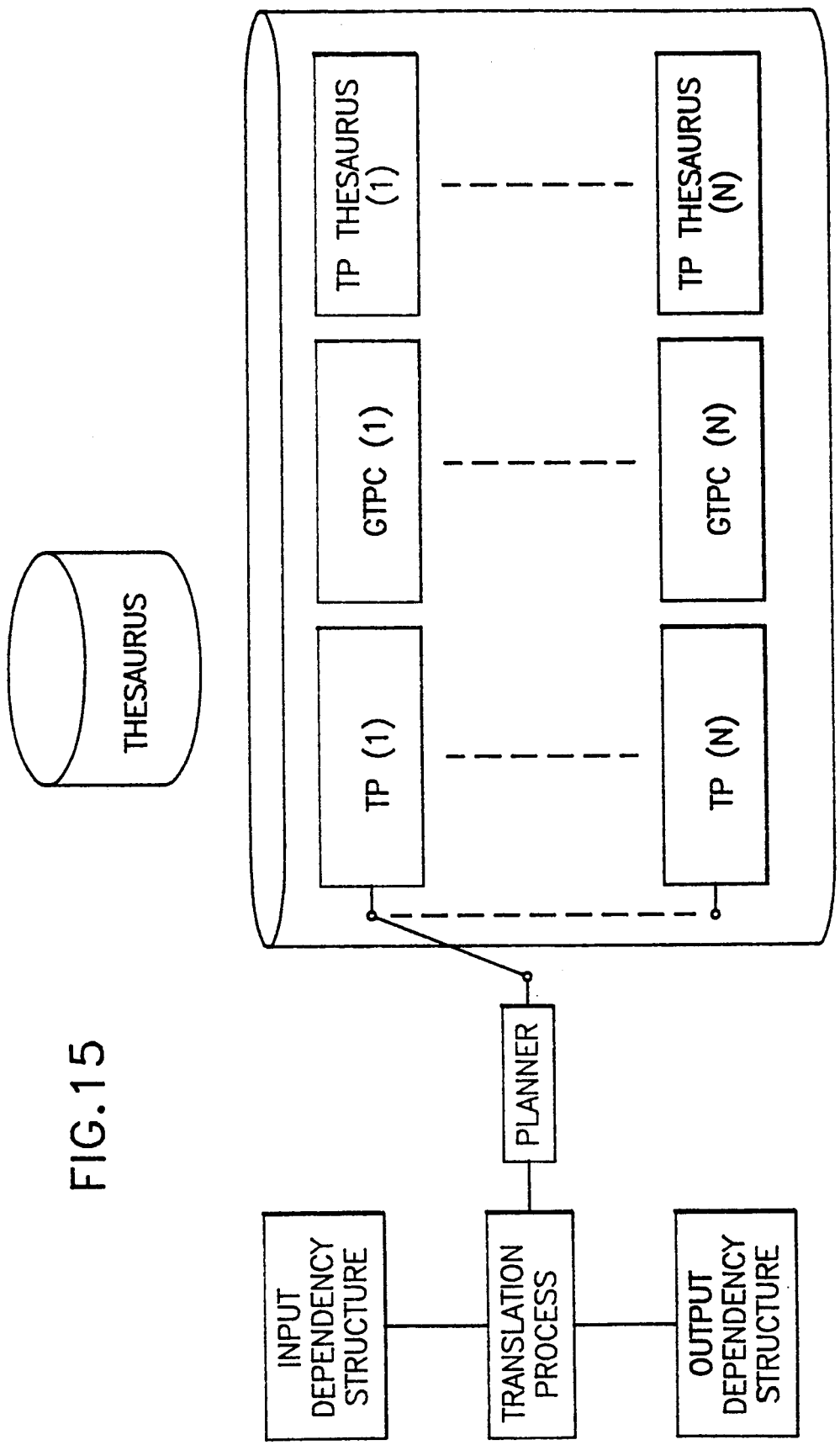
FIG. 15 is a diagram showing the referential relations among data in the translation process.
Figure 16:
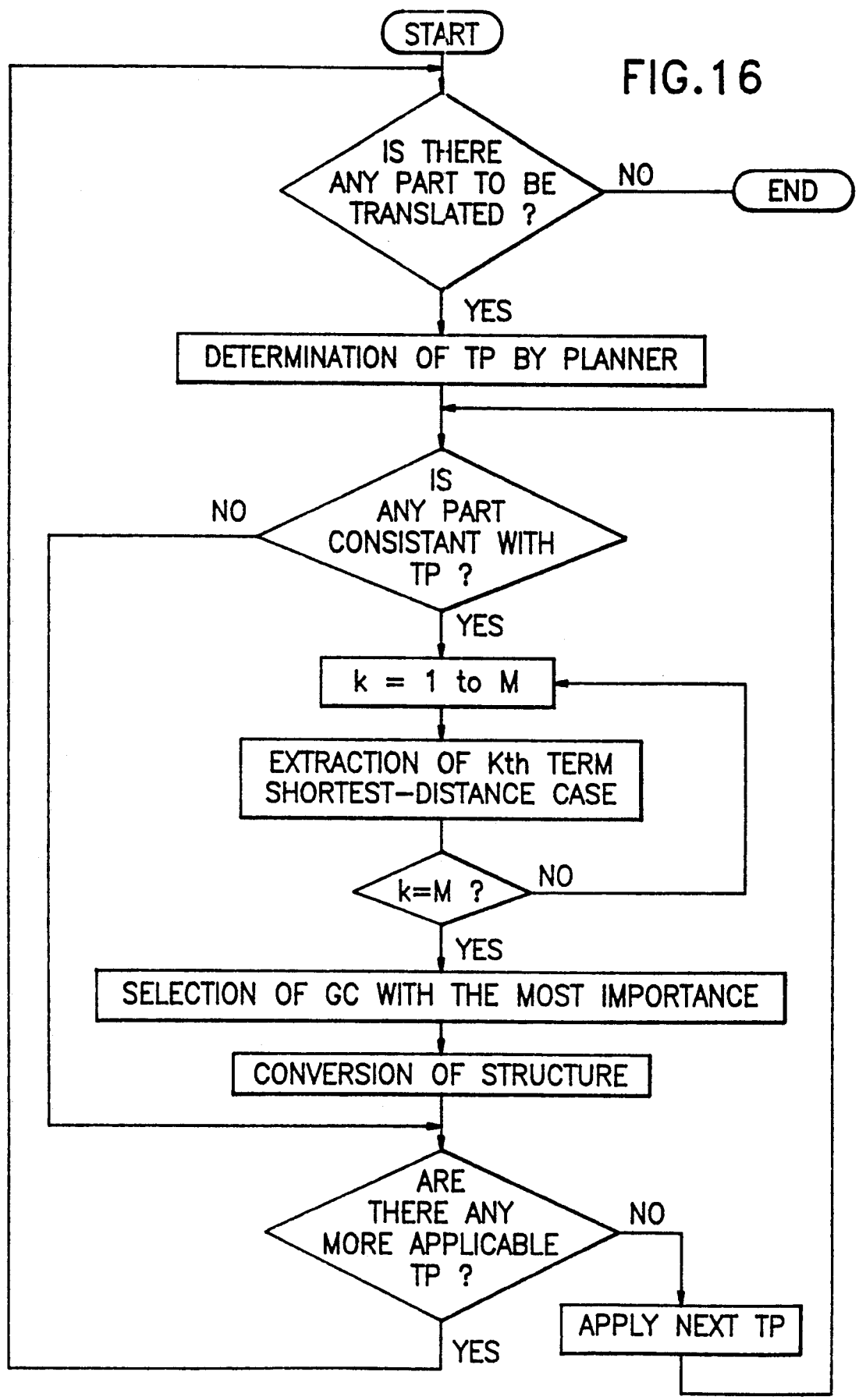
FIG. 16 is a flow chart of the translation process.

The advantages of the foregoing process used in the translation system shown in FIG. 15 are summarized below:

(1) It is not necessary to search for similar cases in a huge case base. Since a case to be applied to the input is a generalized translation pattern case obtained from the case base, the search space is small. This also contributes to conservation of storage resources.

(2) In addition, computation of similarity is not necessary to search for a shortest-distance generalized case to be applied to the input. What is required for selection of the shortest-distance generalized translation pattern case is only to determine whether a concept or a word contained in a generalized case is fully consistent with an input word or a concept found in the thesaurus (an exact match). Moreover, a translation pattern thesaurus is prepared for so me translation patterns, and this contributes to a reduction of the search space. Further, even if multiple of candidates for the shortest-distance generalized case are found, it is sufficient to compare the importances assigned to the m; this requires less computation to select the shortest-distance generalized case than conventional similarity computation.

(3) The advantages of CBMT over RBMT, such as its capability to handle exceptions, are maintained.

As explained above, the invention makes possible machine translation with a high processing efficiency while maintaining the advantages of conventional CBMT, because it generalizes pattern cases obtained from translation cases, uses the generalized cases in the translation process, and does not need a large amount of computation to search for cases similar to the input.

Having thus described our invention, what we claim as new and desire to secure by Letters Patent is:

1. A method for constructing a knowledge base for responding to an input source-language word pattern that meets a translation pattern description and outputting a translation in a target language, from translation cases stored in a case base, by using a thesaurus describing hierarchies of words and concepts in the source language, comprising the steps of:

(a) searching the case base to find one or more translation cases using a selected translation pattern description, the selected translation pattern description having a source language pattern with source values, an associated target language pattern with target values, and links that relate respective source and target values, the translation pattern description being selected when the input-source language word pattern matches the source language pattern;

(b) extracting one or more matching translation cases having words in the source language that meet one or more translation pattern description conditions and extracting a respective corresponding translation for the extracted translation cases, the extracted matching translation cases and corresponding translations being a set of translation pattern cases, the extracted matching translation cases having the words in the source language as source values and the corresponding translations having a target value determined by a translation of their respective source values;

(c) generating a partial thesaurus for one or more translation pattern cases in the set of translation pattern cases, the partial thesaurus created by extracting parts of a thesaurus that contain the source values and hypernyms of the source values and obtaining for each of said source values and hypernyms a corresponding translation, the source value and corresponding translation comprising a pair, the pair and a corresponding frequency of occurrence of the pair comprising a word node in a hierarchy of word nodes in the partial thesaurus;

(d) computing an importance value of a translation for each word node contained in said partial thesaurus on the basis of said frequency of the word node; and (e) determining whether to convert a word contained in a translation pattern case into a hypernym in said partial thesaurus by using the importance value of a corresponding translation computed for the hypernym, and, if possible, converting the word into the hypernym in order to generalize said translation pattern case.

2. The method according to claim 1 wherein the importance of a generalized case is computed on the basis of the importance of the corresponding translation of the pair which is computed for word nodes contained in said generalized case.

3. The method according to claim 1 wherein said step (e) is repeated, and duplicated generalized cases are deleted during the repetition.

4. The method according to claim 1 wherein said conditions are described by using variables that hold words in the source language as their values.

5. The method according to claim 4 wherein said step (c) generates a partial thesaurus for each source language value; and said step (c) also uses the importance value of the translations computed for concepts contained in a partial thesaurus corresponding to another variable to determine whether to convert a word into a hypernym thereof.

6. The method according to claim 1 wherein said step (d) computes the importance value of a translation for a direct hypernym of a word contained in a partial thesaurus by using frequency information obtained for words that are hyponyms of said hypernym.

7. The method according to claim 6 wherein the importance value of a translation for a higher-level word node is computed recursively by using the importance of the translation for a lower-level word node.

8. The method according to claim 6 wherein, in response to a translation corresponding to a direct hypernym of a word whose importance is second or lower for the hypernym but larger than a predetermined threshold, some of the words that are hyponyms of said hypernym are subcategorized into a new concept.

9. The method according to claim 1 wherein, if translation rules are provided, said translation rules being described of translation cases in said case base their importances are computed on the basis of corresponding translations for concepts contained in said rules, and said translation rules are stored in said knowledge base with their computed importances.

10. A translation knowledge base system comprising means for accumulating generalized cases for outputting translations into a target language in response to the input of a source-language word pattern comprising:

(a) a translation pattern description means for searching a case base to find one or more translation cases that match the translation pattern description means, the translation pattern description means having a source language pattern with source values, and associated target language pattern with target values, and links that relate respective source and target values;

(b) a set of translation pattern cases extracted by matching translation cases having words in the source language that meet one or more translation pattern description conditions and having a corresponding translation for the extracted translation cases;

(c) a partial thesaurus for each translation pattern case in the set of translation pattern cases, the partial thesaurus representing the hierarchies of words contained in the translation pattern cases and concepts that are hypernyms of said words in said thesaurus, the partial thesaurus also having information for each of the words being a corresponding translation, the word and corresponding translation comprising a pair, the pair and a corresponding frequency of occurrence of the pair comprising a words node in a hierarchy of word nodes in the partial thesaurus;

(d) an importance value of a translation for each concept contained in said partial thesaurus computed from the frequency of the word node; and (e) a means for determining whether to convert a word contained in a pattern case into a hypernym in said partial thesaurus by using the importance value of a corresponding translation computed for the hypernym, and, if possible, converting the word into the hypernym in order to generalize the pattern case.

11. A method for machine translation from an input expressed in a source language into an output expressed in a target language by using a knowledge base for responding to an input source language word pattern comprising the steps of:

(a) searching the knowledge base to find one or more translation cases using a selected translation pattern description, the selected translation pattern description having a source language pattern with source values, an associated target language pattern with target values, and links that relate respective source and target values, the translation pattern description being selected when the input source language word pattern matches the source language pattern;

(b) extracting one or more matching translation cases having words in the source language that meet one or more translation pattern description conditions and extracting a respective corresponding translation for the extracted translation cases, the extracted matching translation cases and corresponding translations being a set of translation pattern cases, the extracted matching translation cases having the words in the source language as source values and the corresponding translations having a target value determined by a translation of their respective source values;

(c) generating a partial thesaurus for one or more translation pattern cases in the set of translation pattern cases, the partial thesaurus created by extracting parts of a thesaurus that contain the source values and hypernyms of the source values and obtaining for each of said source values and hypernyms a corresponding translation, the source value and corresponding translation comprising a pair, the pair and a corresponding frequency of occurrence of the pair comprising a word node in a hierarchy of word nodes in the partial thesaurus;

(d) computing an importance value of a translation for each word node contained in said partial thesaurus on the basis of said frequency of the word node and using the importance value to determine whether to generalize the translation pattern case by converting a word to a hypernym;

(e) obtaining a target value translation by using the importance values of the word nodes; and (f) using the obtained target value in a target language pattern as the translation of the source language input.

12. The method according to claim 11 wherein said generalized cases are provided with importances reflecting the frequencies of cases assigned to them, and wherein, if multiple generalized cases are obtained in said step (d), their importances are compared to determine which generalized case to use.

13. The method according to claim 11 wherein said step (d) determines whether a concept that is not contained in said thesaurus is applicable to translation under said conditions, and wherein, if any, said concept is used together with said thesaurus in step (c).

* * * * *